(12) United States Patent
Jung

(10) Patent No.: US 8,610,847 B2
(45) Date of Patent: Dec. 17, 2013

(54) LIQUID CRYSTAL DISPLAY AND FABRICATING METHOD THEREOF

(75) Inventor: Youn-Hwan Jung, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 340 days.

(21) Appl. No.: 12/926,732

(22) Filed: Dec. 7, 2010

(65) Prior Publication Data

US 2011/0181817 A1    Jul. 28, 2011

(30) Foreign Application Priority Data

Jan. 28, 2010   (KR) .................. 10-2010-0007905

(51) Int. Cl.
*G02F 1/1335*   (2006.01)

(52) U.S. Cl.
USPC ........... 349/106; 349/105; 349/107; 349/108; 349/109; 349/111; 349/104; 349/110; 359/891; 156/100

(58) Field of Classification Search
USPC ........ 349/104–111; 455/90, 550, 24; 359/891
See application file for complete search history.

(56) References Cited

U.S. PATENT DOCUMENTS

| | | | | |
|---|---|---|---|---|
| 5,910,829 | A * | 6/1999 | Shimada et al. | 349/110 |
| 7,307,673 | B2 * | 12/2007 | Nakayoshi et al. | 349/39 |
| 7,630,033 | B2 * | 12/2009 | Ong | 349/106 |
| 7,710,530 | B2 * | 5/2010 | Tsubata | 349/156 |
| 2003/0040287 | A1 | 2/2003 | Lee | |
| 2009/0128754 | A1 * | 5/2009 | Suzuki et al. | 349/106 |
| 2009/0153785 | A1 * | 6/2009 | Iwato et al. | 349/106 |
| 2009/0185115 | A1 * | 7/2009 | Nishida et al. | 349/106 |
| 2010/0141875 | A1 * | 6/2010 | Shim et al. | 349/106 |
| 2010/0157211 | A1 * | 6/2010 | Kim et al. | 349/106 |
| 2010/0220268 | A1 * | 9/2010 | Ohtani et al. | 349/106 |

FOREIGN PATENT DOCUMENTS

| | | |
|---|---|---|
| JP | 06-138456 A | 5/1994 |
| JP | 07-191213 A | 7/1995 |
| JP | 08-006006 A | 1/1996 |
| JP | 09-005756 | 1/1997 |
| JP | 09-211440 A | 8/1997 |
| JP | 09-325206 A | 12/1997 |
| JP | 10-062768 A | 3/1998 |
| JP | 2007-171560 A | 7/2007 |

(Continued)

OTHER PUBLICATIONS

Japanese Office Action in JP 2010-178788, dated May 8, 2012 (Jung).

(Continued)

*Primary Examiner* — Edward Glick
*Assistant Examiner* — Sang V Nguyen
(74) *Attorney, Agent, or Firm* — Lee & Morse, P.C.

(57) ABSTRACT

A liquid crystal display (LCD) includes an array substrate having pixel regions, the pixel regions including thin film transistors and pixel electrodes, a color filter substrate above the array substrate, the color filter substrate including a plurality of color filters corresponding to respective pixel regions in the array substrate, a black matrix in spaces between the plurality of color filters, and a color frame layer surrounding the plurality of color filters and the black matrix, and a liquid crystal layer interposed between the array substrate and the color filter substrate.

11 Claims, 4 Drawing Sheets

(56) References Cited

FOREIGN PATENT DOCUMENTS

| KR | 20-0254130 Y1 | 11/2001 |
| KR | 10-2004-0090076 A | 10/2004 |
| KR | 10-2004-0051844 A | 6/2005 |
| KR | 10-2005-0094588 A | 9/2005 |
| KR | 10 2007-0107206 A | 11/2007 |
| KR | 10-2008-0039682 A | 5/2008 |

OTHER PUBLICATIONS

Korean Office Action in KR 10 2010-0007905, dated May 30, 2011 (Jung).

Korean Office Action in KR 10-2010-0007905, dated Sep. 29, 2011 (Jung).

Japanese Office Action in JP 2010-178788, dated Jul. 17, 2012 (Jung).

* cited by examiner

LIQUID CRYSTAL DISPLAY AND FABRICATING METHOD THEREOF

BACKGROUND

1. Field

Example embodiments relate to a liquid crystal display (LCD) and a fabrication method thereof. More particularly, example embodiments relate to a LCD capable of enhancing its aesthetic effect by applying a color frame to a screen and a fabrication method thereof.

2. Description of the Related Art

A LCD is a kind of flat panel display including an array substrate with thin film transistors and pixel electrodes formed thereon, a color filter substrate with color filters and a black matrix formed thereon, and a liquid crystal layer with an anisotropic dielectric constant interposed between the array substrate and the color filter substrate. In such a LCD, a molecular arrangement of liquid crystals is changed by controlling the intensity of an electric field formed in the liquid crystal layer, and accordingly, an amount of light transmitted and emitted through the color filter substrate, i.e., a display surface, displays a desired image.

SUMMARY

Embodiments are directed to a LCD and a fabrication method thereof, which substantially overcome one or more of the problems due to the limitations and disadvantages of the related art.

It is therefore a feature of an embodiment to provide a LCD with a color frame surrounding its screen in order to enhance an image quality and its aesthetic effect.

It is therefore another feature of an embodiment to provide a LCD with a color frame applied to a screen, thereby increasing the degree of freedom in design.

It is yet another feature of an embodiment to provide a method of manufacturing a LCD with one or more of the above features.

At least one of the above and other features and advantages may be realized by providing a LCD, including an array substrate having pixel regions, the pixel regions including thin film transistors and pixel electrodes, a color filter substrate above the array substrate, the color filter substrate including a plurality of color filters corresponding to respective pixel regions in the array substrate, a black matrix in spaces between the plurality of color filters, and a color frame layer surrounding the plurality of color filters and the black matrix, and a liquid crystal layer interposed between the array substrate and the color filter substrate.

The color frame layer may be formed of the same material as at least one of the plurality of the color filters.

The plurality of color filters may include a plurality of red color filters, a plurality of green color filters, and a plurality of blue color filters. The color frame layer may be formed of the same material as the red, green, or blue color filter in the same layer. The color frame layer may be realized in a different color from the plurality of color filters.

The black matrix may be formed on one surface of a transparent substrate. The plurality of color filters may be formed to partially overlap with the black matrix on the transparent substrate having the black matrix formed thereon. The color frame layer may be formed in the same layer with the color filters along the outline of the display region. The black matrix may be extended up to the outline of the display region so as to overlap with the color frame layer.

The color filter substrate may further include a common electrode entirely formed on the transparent substrate on which the plurality of color filters and the color frame layer are formed. Upper surfaces of the color frame layer and the plurality of the color filters may be substantially coplanar and are in contact with a transparent substrate. The color frame layer and the plurality of the color filters may have a substantially same height as measured along a direction normal to the transparent substrate. The color frame layer may directly contact the plurality of the color filters. The plurality of the color filters and the black matrix may define a display region, the color frame layer surrounding the display region.

At least one of the above and other features and advantages may also be realized by providing a fabrication method of a LCD, including respectively forming a plurality of thin film transistors and a plurality of pixel electrodes in pixel regions, thereby forming an array substrate, forming a color filter substrate, and joining the array substrate and the color filter substrate together and injecting a liquid crystal layer therebetween, wherein the forming of the color filter substrate includes forming a black matrix in a non-pixel region between the respective pixel regions on the transparent substrate, and forming a plurality of color filters in the respective pixel regions partitioned by the black matrix on the transparent substrate having the black matrix formed thereon, and forming a color frame layer at the frame of a screen along the outline of a display region in which the plurality of color filters and the black matrix are formed.

In the forming of the plurality of color filters, the color frame layer may be simultaneously formed together with the plurality of color filters by using the same material as some color filters selected from the plurality of color filters.

The forming of the color filters and the color frame layer may include forming the plurality of color filters on a substrate having the black matrix formed thereon; and forming the color frame layer along the outline of the display region in a different process from the process of forming the plurality of color filters.

In the forming of the color frame layer, a color printed layer may be formed along the outline of the display region through a separate printing process.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
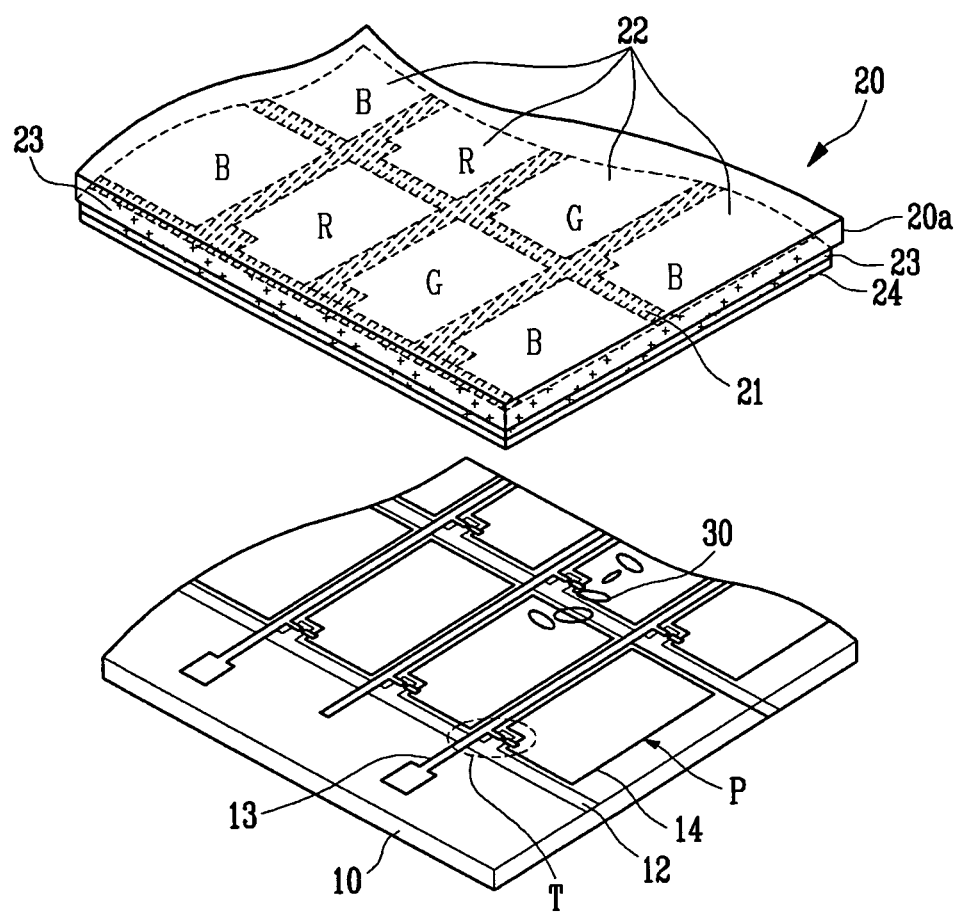
FIG. 1 illustrates a partial, exploded perspective view of a LCD according to an embodiment.

Korean Patent Application No. 10-2010-0007905, filed on Jan. 28, 2010, in the Korean Intellectual Property Office, and entitled: "Liquid Crystal Display and Fabricating Method Thereof," is incorporated by reference herein in its entirety.

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of elements and regions may be exaggerated for clarity of illustration. It will also be understood that when a layer or element is referred to as being "on" another element or substrate, it can be directly on the other element or substrate, or intervening elements may also be present. In addition, it will also be understood that when an element is referred to as being "between" two elements, it can be the only element between the two elements, or one or more intervening elements may also be present. Also, when an element is referred to as being "connected to" another element, it can be directly connected to the other element or one or more intervening elements may also be present. Like reference numerals refer to like elements throughout.

Figure 2:
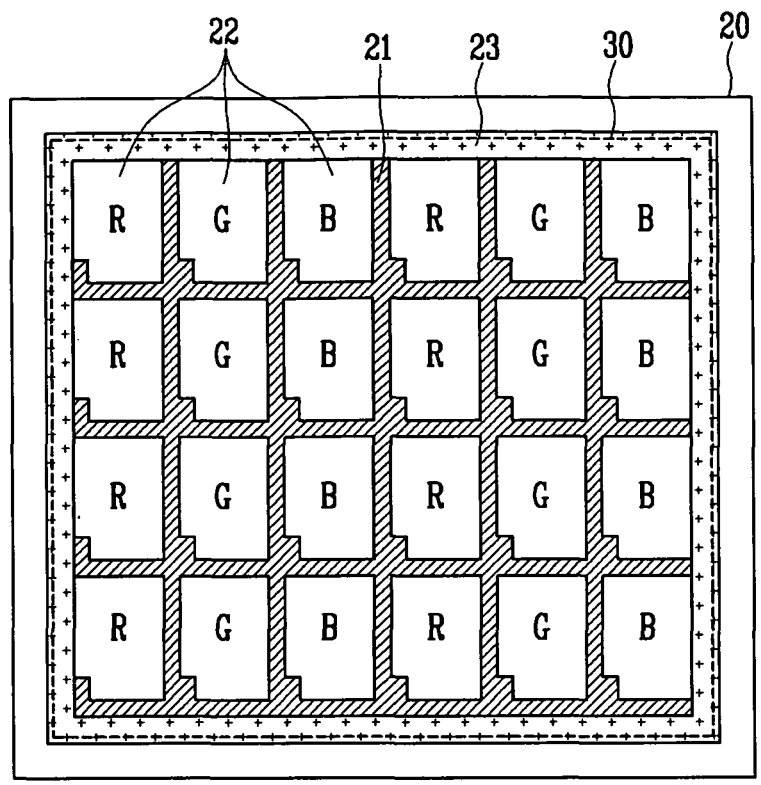
FIG. 2 illustrates a plan view of a color filter substrate of a LCD according to an embodiment.
Figure 3:
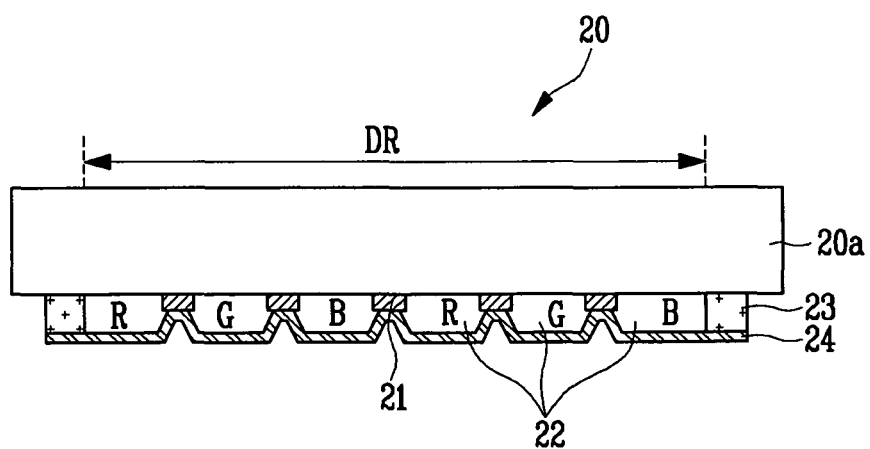
FIG. 3 illustrates a cross-sectional view of the color filter substrate in FIG. 2.

Example embodiments of a LCD will now be described with reference to FIGS. 1-3. FIG. 1 illustrates a partial, exploded perspective view of a LCD according to an embodiment, FIG. 2 illustrates a plan view of a color filter substrate in the LCD of FIG. 1, and FIG. 3 illustrates a cross-sectional view of the color filter substrate in FIG. 2. For convenience of illustration, a common electrode is not illustrated in FIG. 2.

Referring to FIGS. 1 and 2, a LCD according to an embodiment may include an array substrate 10 having a plurality of thin film transistors T and a pixel electrode 14 formed in each pixel region P, a color filter substrate 20 having a plurality of color filters 22 formed to correspond to the respective pixel regions P on the array substrate 10 and a black matrix 21 formed in a space among the plurality of color filters 22, and a liquid crystal layer 30 interposed between the array substrate 10 and the color filter substrate 20. As further illustrated in FIGS. 1-2, the LCD may include a color frame layer 23 in the color filter substrate 20.

In detail, as illustrated in FIG. 1, a plurality of gate lines 12 and a plurality of data lines 13 may be formed on the array substrate 10. The pixel regions P may be defined by the gate lines 12, i.e., arranged in a first direction at a predetermined interval, and the data lines 13, i.e., arranged at a predetermined interval in a second direction vertical to the first direction. The pixel electrode 14 may be formed in each of the pixel regions P.

The thin film transistors T may be formed at intersection portions of the gate and data lines 12 and 13. The thin film transistors T supply data signals from the data lines 13 to the pixel electrodes 14 in response to scan signals supplied from the gate lines 12.

As further illustrated in FIG. 1, the black matrix 21 may be formed on the color filter substrate 20 for shielding light emitted from other portions than the pixel regions P. That is, the plurality of color filters 22 including a plurality of red, green, and blue color filters R, G, and B may be formed on the color filter substrate 20 in regions corresponding to respective pixel regions P on the array substrate 10, and the black matrix 21 may be formed on the color filter substrate 20 to surround, e.g., each of, the plurality of the color filters 22. It is noted that the black matrix 21 and the plurality of color filters 22 may be formed in a display region of the LCD. A common electrode 24 may be formed on the, e.g., entire, color filter substrate 20 having the color filters 22 formed thereon.

It is noted that the black matrix 21, the plurality of color filters 22, and the common electrode 24 may be sequentially formed on one surface of the color filter substrate 20. For example, the black matrix 21, the plurality of color filters 22, and the common electrode 24 may be sequentially formed on a bottom surface, i.e., a surface facing the array substrate 10, of the color filter substrate 20.

As further illustrated in FIGS. 1-2, the color filter substrate 20 may include the color frame layer 23 at a frame of a screen, i.e., along an outer edge of the display region. For example, as illustrated in FIG. 2, the color frame layer 23 may surround, e.g., completely surround, the plurality of color filters 22 with the black matrix 21 on the color filter substrate 20. It is noted that the screen of the LCD refers to a general screen that can be visually recognized by a user through a transparent window (now shown).

The LCD according to an embodiment may include a color frame applied to the screen. For example, in a display or a communication module to which the LCD of this embodiment is applied, the color of the color frame may be designed to correspond to a color of a case (not shown) for accommodating the LCD, so that the color frame may not be brought into relief, or the color frame of the screen may be brought into relief using a color conceived for the purpose of decoration. That is, a color of the color frame 23 may be adjusted not to be seen by a user through the color filter substrate 20, or the color of the color frame may be adjusted to provide a predetermined colored-background to a screen seen by the used. Accordingly, display characteristics and aesthetic effects of the LCD may be enhanced, and the degree of freedom in design may be increased. In contrast, if a colored portable LCD includes a black frame surrounding a black matrix on a display region, the black frame of the screen may be brought into relief and seen through the color filter substrate, thereby interrupting aesthetic effects of the LCD.

The color frame layer 23 will be described in more detail below with reference to FIG. 3. FIG. 3 illustrates a cross-sectional view of the color filter substrate 20.

Referring to FIG. 3, the color filter substrate 20 may include the black matrix 21 on one surface of a transparent substrate 20a, the plurality of color filters 22 on the transparent substrate 20a and in spaces defined by the black matrix 21, the color frame layer 23, and the common electrode 24 on the transparent substrate 20a. The color frame layer 23 may be formed in the same layer as the color filters 22 along the outline of a display region DR, e.g., externally with respect to the display region DR. That is, upper surfaces, i.e., surfaces facing the transparent substrate 20a, of the color frame layer 23 and the color filters 22 may be on, e.g., directly on, the transparent substrate 20a. Further, the color frame layer 23 and the color filters 22 may have a substantially same thickness, as measured from the surface of the transparent substrate 20a. Here, the plurality of color filters 22 may be formed to partially overlap with the black matrix 21.

In the color filter substrate 20, the color frame layer 23 may be formed of the same material as some color filters of the plurality of color filters 22. For example, the color frame layer 23 may be formed of the same material as a red color filter R, a green color filter G, and/or a blue color filter B in the same layer as the color filters 22. In this case, the color frame layer 23 may be simultaneously formed with the color filters 22 in the process of forming the color filters 22, as will be described in more detail below with reference to FIGS. 4A-4C, thereby saving fabrication costs and enhancing fabrication efficiency.

It is noted, however, that example embodiments are not limited thereto. For example, the color frame layer 23 may be formed into a stacked structure of color filters with at least two colors among the red, green, and blue color filters R, G, and B. In another example, the color frame layer 23 may be formed into other colors than the red, green, and blue, e.g., the color frame layer 23 may be realized in different colors from the colors of the color filters 22 by using separate coloring materials.

Figure 4A:
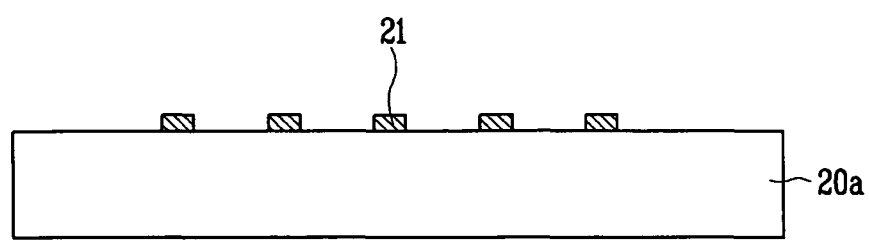
FIGS. 4A to 4C illustrate cross-sectional views of stages in a fabrication method of the color filter substrate in FIG. 3.
Figure 4B:
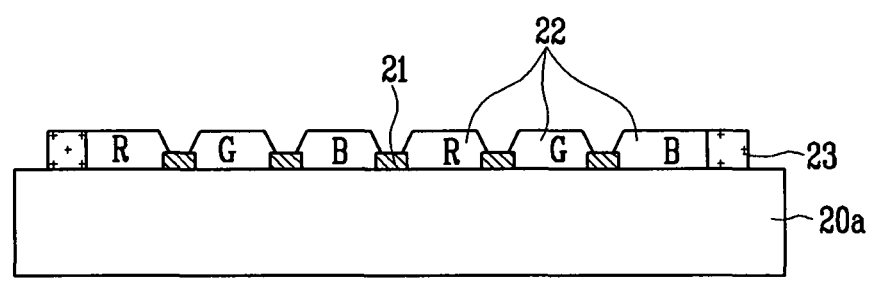
Figure 4C:
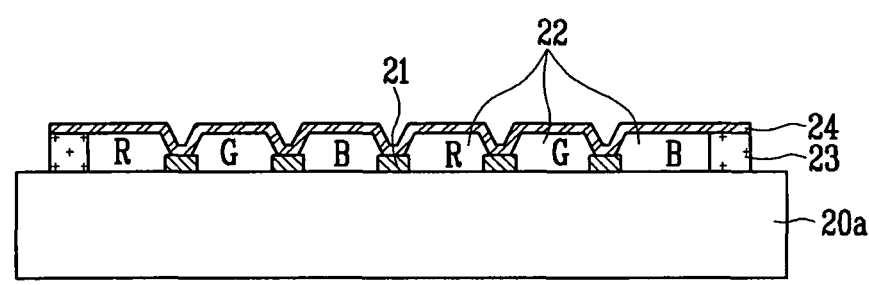

A method of manufacturing a LCD according to example embodiments will be described in detail with reference to FIGS. 4A-4C. FIGS. 4A to 4C illustrate cross-sectional views of stages in a fabrication method of the color filter substrate 20.

As illustrated in FIG. 4A, the black matrix 21 may be first formed on one surface of the transparent substrate 20a. The black matrix 21 may be formed in a non-pixel region, i.e., between pixel regions P. For example, as illustrated in FIG. 2, the black matrix 21 may have a grid pattern to define a matrix pattern for the color patterns 22. The black matrix 21 allows the color filters 22 to be divided into predetermined patterns, and prevents light from leaking at boundaries between adjacent pixel regions P, thereby enhancing a contrast ratio of the LCD.

The black matrix 21 may be formed of an opaque metal, e.g., chromium (Cr) or chromium oxide ($Cr_2O_3$), or of a black resin-based material that absorbs light using various processing methods, e.g., a photolithography method or a microtransfer molding method, which are known in the art. A detailed description of the processing method of the black matrix 21 will be omitted.

Subsequently, as illustrated in FIG. 4B, the plurality color filters 22 and the color frame layer 23 may be formed on the transparent substrate 20a having the black matrix 21 formed thereon. The color filters 22 and the color frame layer 23 may be formed on a same surface of the transparent substrate 20a as the black matrix 21. Here, the plurality of color filters 22 may be respectively formed in the pixel regions P (or regions corresponding to the pixel regions P) partitioned by the black matrix 21. The color frame layer 23 may be formed at the frame of the screen along the outline of the display region including the plurality of color filters 22 and the black matrix 21.

The color filters 22 may be formed by variously applying a material for LCD known in the art and a processing method using the material. In the process of forming the color filters 22, the color frame layer 23 may be simultaneously formed together with the color filters 22 by using the same material as some of the color filters 22. In this case, it may be possible to save fabrication costs and to enhance fabrication efficiency.

However, example embodiments are not limited thereto. That is, the color filters 22 and the color frame layer 23 may be formed of different materials in different processes, respectively. For example, after the plurality of color filters 22 are formed on the transparent substrate 20a having the black matrix 21 formed thereon, a color printed layer may be formed along the outline of the display region through a separate printing process, thereby forming the color frame layer 23. Alternatively, after the color frame layer 23 is first formed on the transparent substrate 20a having the black matrix 21 formed thereon, the plurality of color filters 22 may be formed. In this case, an additional process is added, but the range of selection for the material and processing method of the color frame layer 23 may be increased, e.g., varied.

Next, as illustrated in FIG. 4C, the common electrode 24 may be formed to cover the color filters 22, the color frame layer 23, and the black matrix 21. The common electrode 24 may be in direct contact with each of the color filters 22, the color frame layer 23, and the black matrix 21.

It is noted that only the fabrication method of the color filter substrate 20 of this embodiment is illustrated in FIGS. 4A to 4C. The fabrication method of the LCD may further include forming the plurality of thin film transistors T and the plurality of pixel electrodes 14, illustrated in FIG. 1, in the respective pixel regions P on the array substrate 10. The array substrate 10 and the color filter substrate 20 may be joined together, and the liquid crystal layer 30 may be injected therebetween. Here, formation of the array substrate 10, joining of the array substrate 10 and the color filter substrate 20, and injection of the liquid crystal layer 30 therebetween may be implemented by various methods known in the art. Therefore, their detailed descriptions are omitted.

Figure 5:
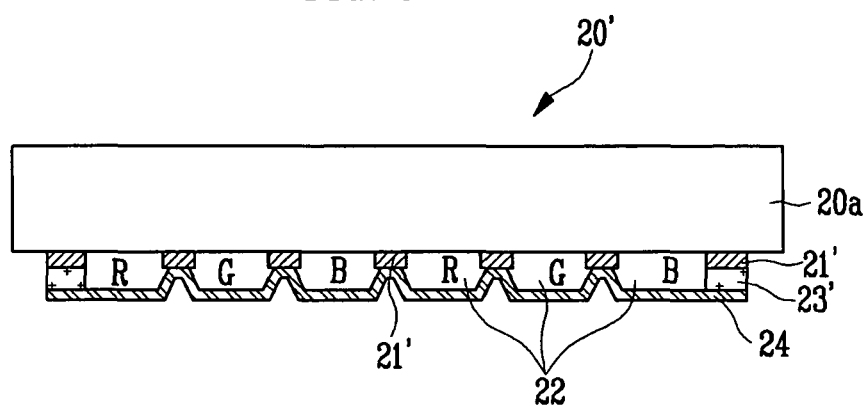
FIG. 5 illustrates a cross-sectional view of a color filter substrate of a LCD according to another embodiment.

A color filter substrate according to another example embodiment will be described hereinafter with reference to FIG. 5. FIG. 5 illustrates a cross-sectional view of a color filter substrate 20' according to another embodiment.

Referring to FIG. 5, a black matrix 21' may be formed on the transparent substrate 20a, and may extend beyond the display region, e.g., may extend to a region surrounding the display region where a color frame layer 23' is to be formed. The color filters 22 may be formed in spaces defined by the black matrix 21'.

The color frame layer 23' may be formed on a portion of the black matrix 21' extending beyond the display region, i.e., the color frame layer 23' and the black matrix 21' may overlap outside the display region. The black matrix 21' may be between the color frame layer 23' and the transparent substrate 20a. A colored outline may be applied to a screen by the color frame layer 23', and it may be possible to effectively prevent a pattern, e.g., a wire, from showing by the black matrix 21' or to effectively prevent light from leaking at the outline of the screen.

Meanwhile, in example embodiments, the LCD has been described as a representative display using the color filter substrate. However, example embodiments are not limited thereto. That is, the technical spirit of the example embodiments in which a color frame is applied to a screen may be applied to various types of displays, e.g., an organic light emitting display. For example, a separate color frame layer may be formed on an upper substrate of an organic light emitting display, i.e., a sealing substrate, thereby enhancing its aesthetic effect.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A liquid crystal display (LCD), comprising:
   an array substrate having pixel regions, the pixel regions including thin film transistors and pixel electrodes;
   a color filter substrate above the array substrate, the color filter substrate including:
      a plurality of color filters corresponding to respective pixel regions in the array substrate,
      a black matrix in spaces between the plurality of color filters, and
      a color frame layer surrounding the plurality of color filters and the black matrix, the color frame layer having different color and coloring material than the plurality of color filters, and the entire color frame being non-black and in direct contact with at least some of the color filters; and
   a liquid crystal layer interposed between the array substrate and the color filter substrate.

2. The LCD as claimed in claim 1, wherein the entire color frame has a uniform color.

3. The LCD as claimed in claim 1, wherein:
the black matrix is on one surface of a transparent substrate;
the plurality of color filters partially overlap the black matrix on the one surface of the transparent substrate; and
the color frame layer is in a same layer as the color filters along an outline of a display region.

4. The LCD as claimed in claim 3, wherein the black matrix extends to the outline of the display region, the black matrix and color frame layer completely overlapping each other in the outline of the display region, the black matrix and color frame having same widths as measured from respective outermost surfaces of the color filters.

5. The LCD as claimed in claim 3, wherein the color filter substrate further comprises a common electrode on the entire transparent substrate, the common electrode overlapping the color frame.

6. The LCD as claimed in claim 1, wherein upper surfaces of the color frame layer and the plurality of the color filters are substantially coplanar and are in contact with a transparent substrate.

7. The LCD as claimed in claim 6, wherein the color frame layer and the plurality of the color filters have a substantially same height as measured along a direction normal to the transparent substrate, the entire color frame having a uniform thickness.

8. The LCD as claimed in claim 1, wherein the plurality of the color filters and the black matrix define a display region, the color frame layer surrounding the display region.

9. A fabrication method of an LCD, comprising:
forming an array substrate with pixel regions, the pixel regions including thin film transistors and pixel electrodes;
forming a color filter substrate above the array substrate, the color filter substrate including:
a plurality of color filters corresponding to respective pixel regions in the array substrate,
a black matrix in spaces between the plurality of color filters, and
a color frame layer surrounding the plurality of color filters and the black matrix, the color frame layer having different color and coloring material than the plurality of color filters, and the entire color frame being non-black and in direct contact with at least some of the color filters;
joining the array substrate and the color filter substrate together; and
forming a liquid crystal layer between the array substrate and the color filter substrate.

10. The fabrication method as claimed in claim 9, wherein forming the color filters and the color frame layer includes:
forming the plurality of color filters on a substrate having the black matrix formed thereon; and
forming the color frame layer along an outline of the display region in a different process from the process of forming the plurality of color filters.

11. The fabrication method as claimed in claim 10, wherein forming the color frame layer includes forming a color printed layer along the outline of the display region.

* * * * *